United States Patent
Zhu et al.

(10) Patent No.: US 12,317,108 B2
(45) Date of Patent: May 27, 2025

(54) TECHNIQUES FOR ESTIMATING SPECTRAL EFFICIENCY FROM SYNCHRONIZATION SIGNAL BLOCK

(71) Applicant: QUALCOMM Incorporated, San Diego, CA (US)

(72) Inventors: Jun Zhu, San Diego, CA (US); Yuan Gao, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 414 days.

(21) Appl. No.: 17/805,593

(22) Filed: Jun. 6, 2022

(65) Prior Publication Data

US 2023/0397023 A1    Dec. 7, 2023

(51) Int. Cl.
*H04W 24/08*    (2009.01)
*H04L 5/00*    (2006.01)

(52) U.S. Cl.
CPC ........... *H04W 24/08* (2013.01); *H04L 5/0048* (2013.01)

(58) Field of Classification Search
CPC .............................. H04W 24/08; H04L 5/0048
See application file for complete search history.

(56) References Cited

U.S. PATENT DOCUMENTS

| | | | | |
|---|---|---|---|---|
| 2012/0134433 A1* | 5/2012 | Haas | ....................... | H04L 1/006 375/265 |
| 2015/0244432 A1 | 8/2015 | Wang | | |
| 2022/0225312 A1* | 7/2022 | Levitsky | .............. | H04B 7/0695 |
| 2023/0170977 A1* | 6/2023 | Zhu | ...................... | H04B 7/0695 375/267 |
| 2023/0318690 A1* | 10/2023 | Kurras | .................. | H04B 7/086 375/262 |

FOREIGN PATENT DOCUMENTS

| WO | WO-2022241362 | 11/2022 |
|---|---|---|
| WO | WO-2023102297 | 6/2023 |

OTHER PUBLICATIONS

International Search Report and Written Opinion—PCT/US2023/021580—ISA/EPO—Aug. 28, 2023.

* cited by examiner

*Primary Examiner* — Derrick V Rose
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may receive, from a network node, a single rank reference signal. The UE may obtain, for multiple candidate beams, one or more single rank measurements from the single rank reference signal. The UE may identify, for each respective candidate beam included among the multiple candidate beams and based at least in part on the one or more single rank measurements obtained from the single rank reference signal for the respective candidate beam, a multiple rank spectral efficiency metric. The UE may identify, from among the multiple candidate beams and based at least in part on the multiple rank spectral efficiency metric associated with each respective candidate beam, a beam to use to communicate with the network node. Numerous other aspects are described.

30 Claims, 7 Drawing Sheets

TECHNIQUES FOR ESTIMATING SPECTRAL EFFICIENCY FROM SYNCHRONIZATION SIGNAL BLOCK

FIELD OF THE DISCLOSURE

Aspects of the present disclosure generally relate to wireless communication and to techniques and apparatuses associated with estimating spectral efficiency from a synchronization signal block (SSB).

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include a memory and one or more processors coupled to the memory. The one or more processors may be configured to receive, from a network node, a single rank reference signal. The one or more processors may be configured to obtain, for multiple candidate beams, one or more single rank measurements from the single rank reference signal. The one or more processors may be configured to identify, for each respective candidate beam included among the multiple candidate beams and based at least in part on the one or more single rank measurements obtained from the single rank reference signal for the respective candidate beam, a multiple rank spectral efficiency metric. The one or more processors may be configured to identify, from among the multiple candidate beams and based at least in part on the multiple rank spectral efficiency metric associated with each respective candidate beam, a beam to use to communicate with the network node.

Some aspects described herein relate to a method of wireless communication performed by a UE. The method may include receiving, from a network node, a single rank reference signal. The method may include obtaining, for multiple candidate beams, one or more single rank measurements from the single rank reference signal. The method may include identifying, for each respective candidate beam included among the multiple candidate beams and based at least in part on the one or more single rank measurements obtained from the single rank reference signal for the respective candidate beam, a multiple rank spectral efficiency metric. The method may include identifying, from among the multiple candidate beams and based at least in part on the multiple rank spectral efficiency metric associated with each respective candidate beam, a beam to use to communicate with the network node.

Some aspects described herein relate to a non-transitory computer-readable medium that stores a set of instructions for wireless communication by a UE. The set of instructions, when executed by one or more processors of the UE, may cause the UE to receive, from a network node, a single rank reference signal. The set of instructions, when executed by one or more processors of the UE, may cause the UE to obtain, for multiple candidate beams, one or more single rank measurements from the single rank reference signal. The set of instructions, when executed by one or more processors of the UE, may cause the UE to identify, for each respective candidate beam included among the multiple candidate beams and based at least in part on the one or more single rank measurements obtained from the single rank reference signal for the respective candidate beam, a multiple rank spectral efficiency metric. The set of instructions, when executed by one or more processors of the UE, may cause the UE to identify, from among the multiple candidate beams and based at least in part on the multiple rank spectral efficiency metric associated with each respective candidate beam, a beam to use to communicate with the network node.

Some aspects described herein relate to an apparatus for wireless communication. The apparatus may include means for receiving, from a network node, a single rank reference signal. The apparatus may include means for obtaining, for multiple candidate beams, one or more single rank measurements from the single rank reference signal. The apparatus may include means for identifying, for each respective candidate beam included among the multiple candidate beams and based at least in part on the one or more single rank measurements obtained from the single rank reference signal for the respective candidate beam, a multiple rank spectral efficiency metric. The apparatus may include means for identifying, from among the multiple candidate beams and based at least in part on the multiple rank spectral efficiency metric associated with each respective candidate beam, a beam to use to communicate with the network node.

Aspects generally include a method, apparatus, system, computer program product, non-transitory computer-readable medium, user equipment, base station, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
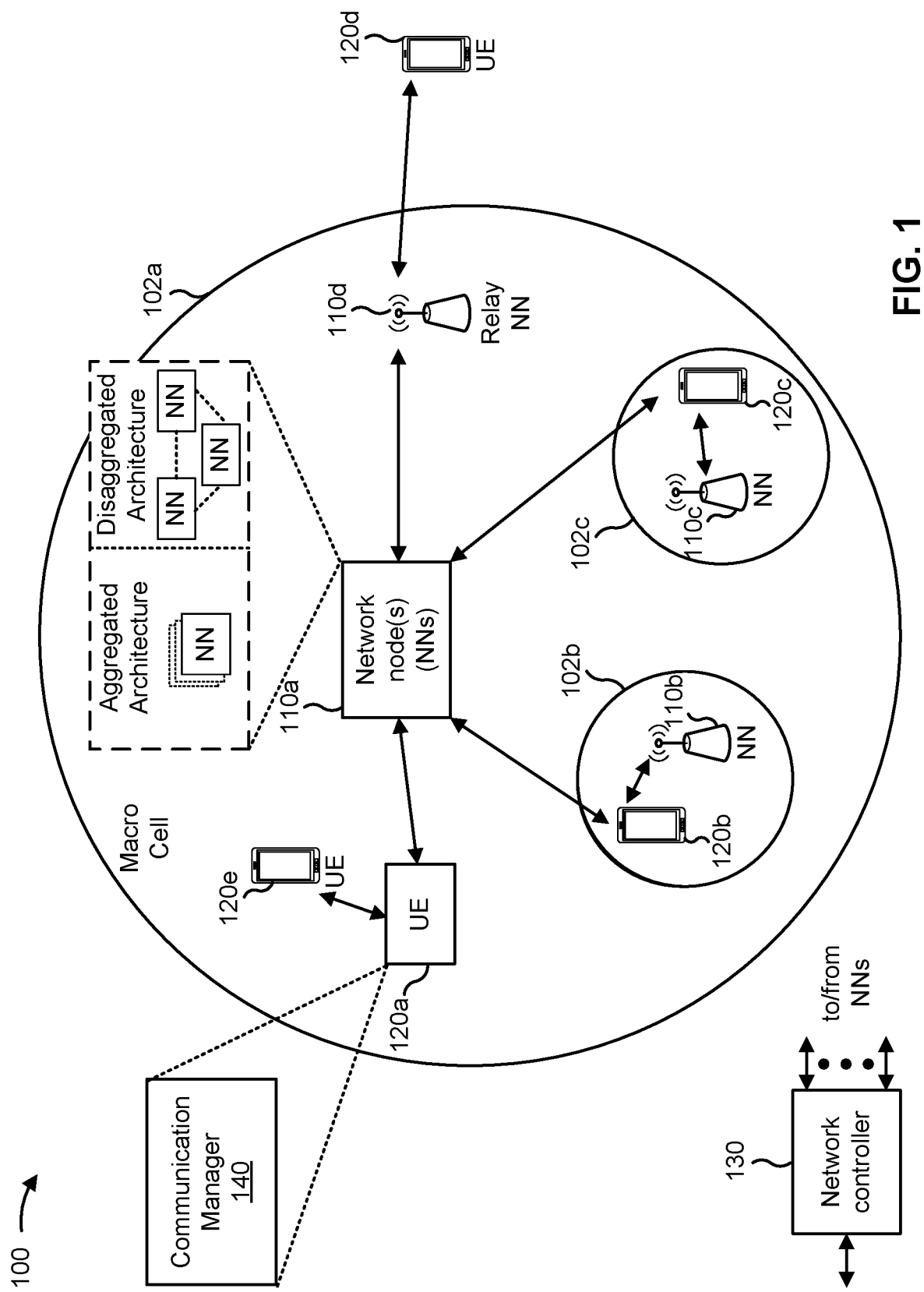
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a radio protocol stack that is physically or logically distributed among two or more nodes (such as one or more central units (CUs), one or more distributed units (DUs), or one or more radio units (RUs)).

In some examples, a network node 110 is or includes a network entity that communicates with UEs 120 via a radio access link, such as an RU. In some examples, a network node 110 is or includes a network entity that communicates with other network nodes 110 via a fronthaul link or a midhaul link, such as a DU. In some examples, a network node 110 is or includes a network entity that communicates with other network nodes 110 via a midhaul link or a core network via a backhaul link, such as a CU. In some aspects, a network node 110 (such as an aggregated network node 110 or a disaggregated network node 110) may include multiple network nodes, such as one or more RUs, one or more DUs, and/or one or more CUs. A network node 110 may include, for example, an NR base station, an LTE base station, a Node B, an eNB (e.g., in 4G), a gNB (e.g., in 5G), an access point, a transmission reception point (TRP), an RU, a DU, a CU, a mobility element of a network, a core network node, a network element, a network equipment, a RAN node, or a combination thereof. In some examples, the network nodes 110 may be interconnected to one another and/or to one or more other network nodes 110 in the wireless network 100 through various types of fronthaul, midhaul, and/or backhaul interfaces, such as a direct physical connection, an air interface, or a virtual network, using any suitable transport network.

In some aspects, a network node 110 may provide communication coverage for a particular geographic area. In the Third Generation Partnership Project (3GPP), the term "cell" can refer to a coverage area of a base station and/or a base station subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station for a macro cell may be referred to as a macro base station. A base station for a pico cell may be referred to as a pico base station. A base station for a femto cell may be referred to as a femto base station or an in-home base station. In the example shown in FIG. 1, the network node 110a may be a macro base station for a macro cell 102a, the network node 110b may be a pico base station for a pico cell 102b, and the network node 110c may be a femto base station for a femto cell 102c. A base station may support one or multiple (e.g., three) cells.

In some examples, a cell may not necessarily be stationary, and the geographic area of the cell may move according to the location of a network node 110 that is mobile (e.g., a mobile base station).

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120 or network nodes 110. In the example shown in FIG. 1, the network node 110d (e.g., a relay base station) may communicate with the network node 110a (e.g., a macro base station) and the UE 120d in order to facilitate communication between the network node 110a and the UE 120d. A network node 110 that relays communications may be referred to as a relay station, a relay base station, a relay node, a relay, or the like.

The wireless network 100 may be a heterogeneous network that includes network nodes 110 of different types, such as macro base stations, pico base stations, femto base stations, relay base stations, TRPs, RUs, or the like. These different types of network nodes 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul or midhaul communication link. The network nodes 110 may communicate with one another directly or indirectly via a wireless or wireline backhaul communication link. In some aspects, the network controller 130 may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a network node 110, a single rank reference signal; obtain, for multiple candidate beams, one or more single rank measurements from the single rank reference signal; identify, for each respective candidate beam included among the multiple candidate beams and based at least in part on the one or more single rank measurements obtained from the single rank reference signal for the respective candidate beam, a multiple rank spectral efficiency metric; and identify, from among the multiple candidate beams and based at least in part on the multiple rank spectral efficiency metric associated with each respective candidate beam, a beam to use to communicate with the network node 110. Additionally, or alternatively, the communication manager 140 may perform one or more other operations described herein.

As indicated above, FIG. 1 is provided as an example. Other examples may differ from what is described with regard to FIG. 1.

Figure 2:
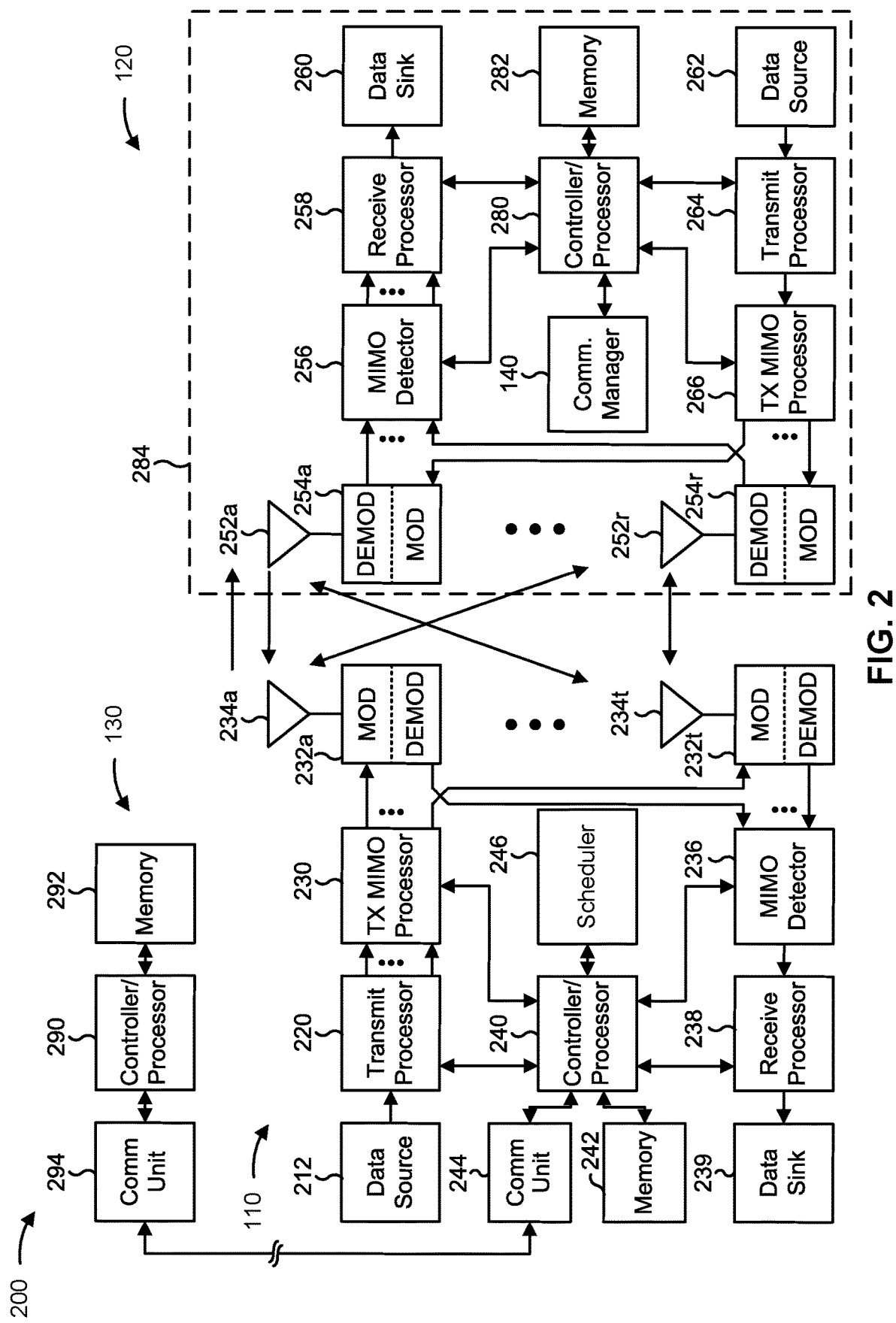
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. For example, some network nodes 110 may not include radio frequency components.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-7).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-7).

The controller/processor 240 of the network node 110, the controller/processor 280 of the UE 120, and/or any other component(s) of FIG. 2 may perform one or more techniques associated with estimating spectral efficiency from a synchronization signal block (SSB), as described in more detail elsewhere herein. For example, the controller/processor 240 of the network node 110, the controller/processor 280 of the UE 120, and/or any other component(s) of FIG. 2 may perform or direct operations of, for example, process 600 of FIG. 6 and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 600 of FIG. 6 and/or other processes as described herein. In some examples, executing instructions may include running the instructions, converting the instructions, compiling the instructions, and/or interpreting the instructions, among other examples.

In some aspects, the UE 120 includes means for receiving, from the network node 110, a single rank reference signal; means for obtaining, for multiple candidate beams, one or more single rank measurements from the single rank reference signal; means for identifying, for each respective candidate beam included among the multiple candidate beams and based at least in part on the one or more single rank measurements obtained from the single rank reference signal for the respective candidate beam, a multiple rank spectral efficiency metric; and/or means for identifying, from among the multiple candidate beams and based at least in part on the multiple rank spectral efficiency metric associated with each respective candidate beam, a beam to use to communicate with the network node. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
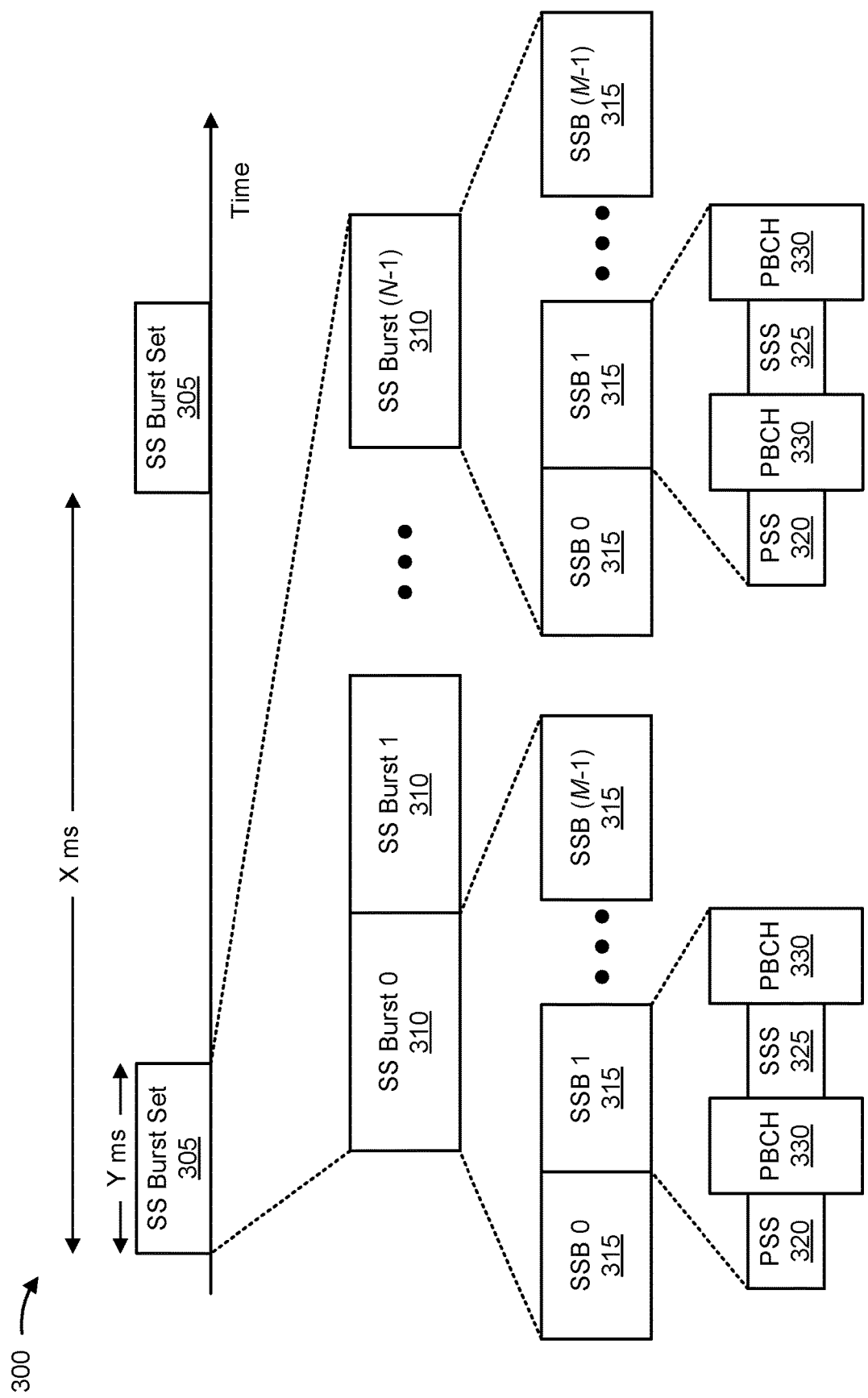
FIG. 3 is a diagram illustrating an example of a synchronization signal hierarchy, in accordance with the present disclosure.

FIG. 3 is a diagram illustrating an example 300 of a synchronization signal (SS) hierarchy, in accordance with the present disclosure. As shown in FIG. 3, the SS hierarchy may include an SS burst set 305, which may include multiple SS bursts 310, shown as SS burst 0 through SS burst N−1, where N is a maximum number of repetitions of the SS burst 310 that may be transmitted by the base station. As further shown, each SS burst 310 may include one or more SS blocks (SSBs) 315, shown as SSB 0 through SSB M−1, where M is a maximum number of SSBs 315 that can be carried by an SS burst 310. In some aspects, different SSBs 315 may be beam-formed differently (e.g., transmitted using different beams), and may be used for cell search, cell acquisition, beam management, and/or beam selection (e.g., as part of an initial network access procedure). An SS burst set 305 may be periodically transmitted by a wireless network node (e.g., network node 110), such as every X milliseconds, as shown in FIG. 3. In some aspects, an SS burst set 305 may have a fixed or dynamic length, shown as Y milliseconds in FIG. 3. In some cases, an SS burst set 305 or an SS burst 310 may be referred to as a discovery reference signal (DRS) transmission window or an SSB measurement time configuration (SMTC) window.

In some aspects, an SSB 315 may include resources that carry a primary synchronization signal (PSS) 320, a secondary synchronization signal (SSS) 325, and/or a physical broadcast channel (PBCH) 330. In some aspects, multiple SSBs 315 are included in an SS burst 310 (e.g., with transmission on different beams), and the PSS 320, the SSS 325, and/or the PBCH 330 may be the same across each SSB 315 of the SS burst 310. In some aspects, a single SSB 315 may be included in an SS burst 310. In some aspects, the SSB 315 may be at least four symbols (e.g., OFDM symbols) in length, where each symbol carries one or more of the PSS 320 (e.g., occupying one symbol), the SSS 325 (e.g., occupying one symbol), and/or the PBCH 330 (e.g., occupying two symbols). In some aspects, an SSB 315 may be referred to as an SS/PBCH block.

In some aspects, as shown in FIG. 3, the symbols of an SSB 315 may be consecutive. Additionally, or alternatively, in some aspects, the symbols of an SSB 315 may be non-consecutive. Similarly, in some aspects, one or more SSBs 315 of the SS burst 310 may be transmitted in consecutive radio resources (e.g., consecutive symbols) during one or more slots. Additionally, or alternatively, one or more SSBs 315 of the SS burst 310 may be transmitted in non-consecutive radio resources.

In some aspects, the SS bursts 310 may have a burst period, and the SSBs 315 of the SS burst 310 may be transmitted by a wireless network node (e.g., network node 110) according to the burst period. In this case, the SSBs 315 may be repeated during each SS burst 310. In some aspects, the SS burst set 305 may have a burst set periodicity, whereby the SS bursts 310 of the SS burst set 305 are transmitted by the wireless network node according to the fixed burst set periodicity. In other words, the SS bursts 310 may be repeated during each SS burst set 305.

In some aspects, an SSB 315 may include an SSB index, which may correspond to a beam used to carry the SSB 315. A UE 120 may monitor for and/or measure SSBs 315 using different receive (Rx) beams during an initial network access procedure, a cell search procedure, a beam selection procedure, a beam sweeping procedure, and/or a beam refinement procedure, among other examples. Based at least in part on the monitoring and/or measuring, the UE 120 may indicate one or more SSBs 315 with a best signal parameter (e.g., a highest RSRP parameter and/or a highest spectral efficiency metric) to the wireless network node. The wireless network node and the UE 120 may use the one or more indicated SSBs 315 to select one or more beams to be used for communication between the network node 110 and the UE 120 (e.g., for a random access channel (RACH) procedure). Additionally, or alternatively, the UE 120 may use the SSB 315 and/or the SSB index to determine a cell timing for a cell via which the SSB 315 is received (e.g., a serving cell).

As indicated above, FIG. 3 is provided as an example. Other examples may differ from what is described with regard to FIG. 3.

Figure 4:
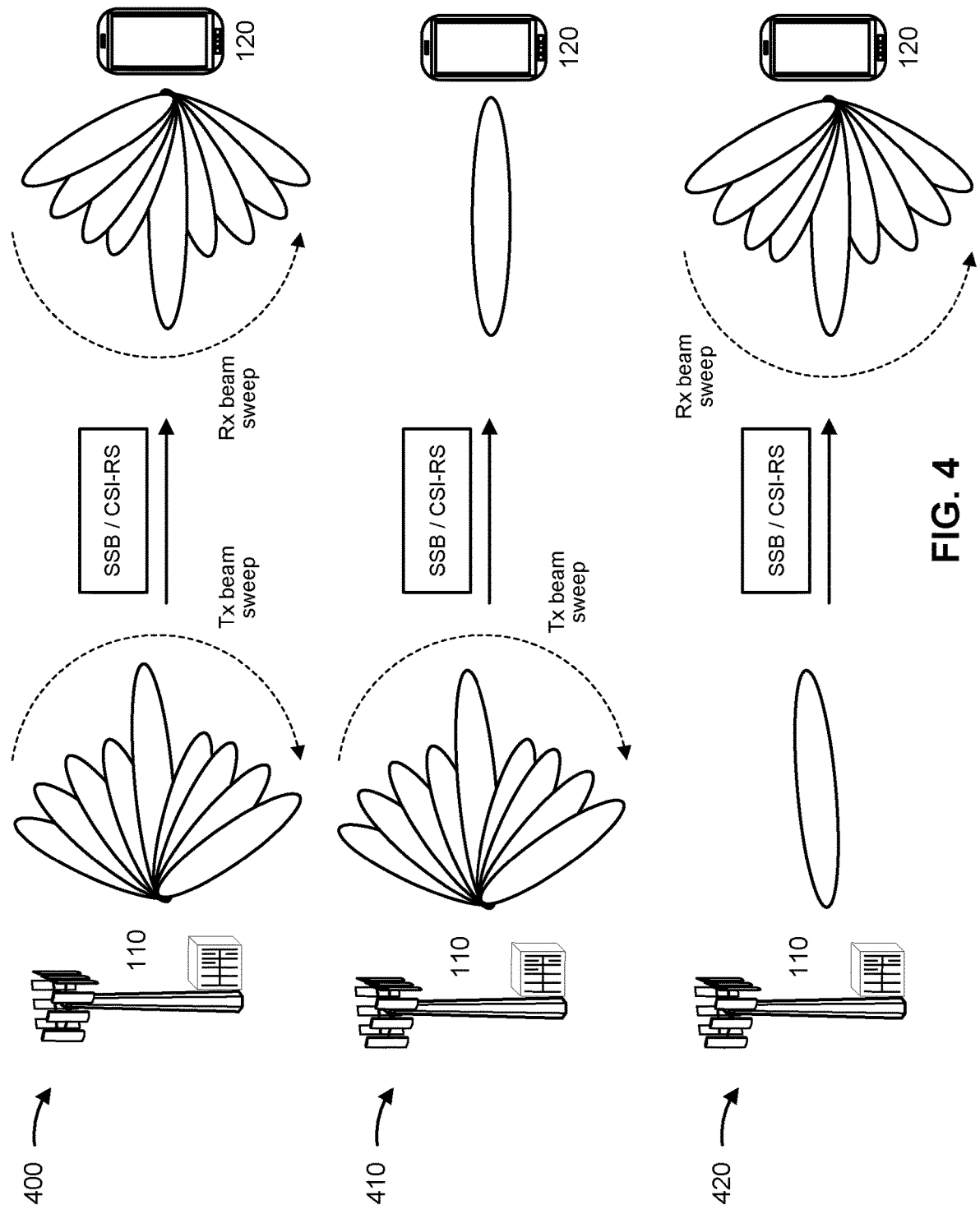
FIG. 4 is a diagram illustrating examples of beam management procedures, in accordance with the present disclosure.

FIG. 4 is a diagram illustrating examples 400, 410, and 420 of beam management procedures based on downlink reference signal transmissions, in accordance with the present disclosure. As shown in FIG. 4, examples 400, 410, and 420 include a UE 120 in communication with a network node 110 in a wireless network (e.g., wireless network 100). However, the devices shown in FIG. 4 are provided as examples, and the wireless network may support communication and beam management between other devices (e.g., between a UE 120 and a TRP, DU, or RU, between a mobile termination node and a control node, between an integrated access and backhaul (IAB) child node and an IAB parent node, and/or between a scheduled node and a scheduling node). In some aspects, the UE 120 and the network node 110 may be in a connected state (e.g., a radio resource control (RRC) connected state) when performing the beam management procedure(s).

As shown in FIG. 4, example 400 may include the network node 110 and the UE 120 communicating to perform beam management using SSB transmissions or channel state information reference signal (CSI-RS) transmissions. Example 400 depicts a first beam management procedure (e.g., P1 beam management). The first beam management procedure may be referred to as a beam selection procedure, an initial beam acquisition procedure, a beam sweeping procedure, a cell search procedure, and/or a beam search procedure. As shown in FIG. 4 and example 400, SSBs and/or CSI-RSs may be configured to be transmitted from the network node 110 to the UE 120 during the first beam management procedure. For example, an SSB transmitted by the network node 110 is a single rank (rank-1) periodic reference signal that is always transmitted by the network node 110 to enable initial network acquisition and synchronization in addition to beam selection and beam management. For example, an identifier associated with an SSB may have a one-to-one mapping to a transmit beam used by the network node 110, and the one-to-one mapping may be invariant (e.g., static) over time. Additionally, or alternatively, in cases where CSI-RS transmissions are used for the first beam management procedure, the CSI-RSs used for beam selection or beam management may be configured to be periodic (e.g., using RRC signaling), semi-persistent (e.g., using media access control (MAC) control element (MAC-CE) signaling), and/or aperiodic (e.g., using downlink control information (DCI)).

The first beam management procedure may include the network node 110 performing a beam sweep over multiple transmit (Tx) beams. The network node 110 may transmit an SSB or a CSI-RS using each transmit beam for beam management. To enable the UE 120 to perform receive (Rx) beam sweeping, the network node 110 may use a transmit beam to transmit (e.g., with repetitions) each SSB or CSI-RS at multiple times within the same reference signal resource set so that the UE 120 can perform a beam sweep over multiple receive beams in multiple transmission instances. For example, if the network node 110 has a set of N transmit beams and the UE 120 has a set of M receive beams, the SSB or CSI-RS may be transmitted on each of the N transmit beams M times such that the UE 120 may receive M instances of the SSB or CSI-RS per transmit beam. In other words, for each transmit beam of the network node 110, the UE 120 may perform a beam sweep through the receive beams of the UE 120. As a result, the first beam management procedure may enable the UE 120 to measure an SSB or CSI-RS on different transmit beams using different receive beams to support selection of one or more transmit/receive beam pair(s) (e.g., a pairing between a transmit beam of the network node 110 and a receive beam of the UE 120). The UE 120 may report the measurements to the network node 110 to enable the network node 110 to select one or more beam pairs for communication between the network node 110 and the UE 120.

As shown in FIG. 4, example 410 may include the network node 110 and the UE 120 communicating to perform beam management using SSB transmissions or CSI-RS transmissions. Example 410 depicts a second beam management procedure (e.g., P2 beam management). The second beam management procedure may be referred to as a beam refinement procedure, a base station beam refinement procedure, a network node beam refinement procedure, and/or a transmit beam refinement procedure, among other examples. As shown in FIG. 4 and example 410, SSBs and/or CSI-RSs may be configured to be transmitted from the network node 110 to the UE 120. The SSBs may be periodic, and the CSI-RSs may be configured to be aperiodic (e.g., using DCI). The second beam management procedure may include the network node 110 performing a beam sweep over one or more transmit beams. The one or more transmit beams may be a subset of all transmit beams associated with the network node 110 (e.g., determined based at least in part on measurements reported by the UE 120 in connection with the first beam management procedure). The network node 110 may transmit an SSB or a CSI-RS using each transmit beam of the one or more transmit beams for beam management. The UE 120 may measure each SSB or CSI-RS using a single (e.g., a same) receive beam (e.g., determined based at least in part on measurements performed in connection with the first beam management procedure). The second beam management procedure may enable the network node 110 to select a best transmit beam based at least in part on measurements of the SSBs and/or CSI-RSs (e.g., measured by the UE 120 using the single receive beam) reported by the UE 120.

As shown in FIG. 4, example 420 depicts a third beam management procedure (e.g., P3 beam management). The third beam management procedure may be referred to as a beam refinement procedure, a UE beam refinement procedure, a receive beam refinement procedure, and/or a UE beam management procedure, among other examples. As shown in FIG. 4 and example 420, one or more SSBS or CSI-RSs may be configured to be transmitted from the network node 110 to the UE 120. The SSBs may be configured to be periodic, and the CSI-RSs may be configured to be aperiodic (e.g., using DCI). The third beam management process may include the network node 110 transmitting the one or more SSBs or CSI-RSs using a single transmit beam (e.g., determined based at least in part on measurements reported by the UE 120 in connection with the first beam management procedure and/or the second beam management procedure). To enable the UE 120 to perform receive beam sweeping, the network node 110 may use a transmit beam to transmit (e.g., with repetitions) an SSB or CSI-RS at multiple times within the same reference signal resource set such that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the UE 120 to select a best receive beam based at least in part on measurements of the SSBs or CSI-RSs and/or may enable the network node 110 to select a best receive beam for the UE 120 based at least in part on reported measurements received from the UE 120 (e.g., measurements of the SSB and/or CSI-RS using the one or more receive beams).

In some cases, the UE 120 and the network node 110 may use beamforming to improve performance associated with downlink and/or uplink communication over a millimeter wave (mmW) channel. For example, a mmW channel (e.g., in FR2 and/or FR4) may suffer from high propagation loss because mmW signals have a higher frequency and a shorter wavelength than various other radio waves used for communications (e.g., sub-6 GHz communications in FR1). As a result, mmW signals often have shorter propagation distances, may be subject to atmospheric attenuation, and/or may be more easily blocked and/or subject to penetration loss through objects or other obstructions, among other examples. For example, a mmW signal may be reflected by lamp posts, vehicles, glass/windowpanes, and/or metallic objects, may be diffracted by edges or corners of buildings and/or walls, and/or may be scattered via irregular objects such as walls and/or human bodies (e.g., a hand blocking an antenna module when a device is operated in a gaming mode). Accordingly, beamforming may be used at both the UE 120 and the network node 110 to counter the propagation loss in a mmW channel and thereby improve performance for mmW communication. For example, to achieve a beamforming gain on a downlink, the network node 110 may generate a downlink transmit beam that is steered in a particular direction and the UE 120 may generate a corresponding downlink receive beam. Similarly, to achieve a beamforming gain on an uplink, the UE 120 may generate an uplink transmit beam that is steered in a particular direction, and the network node 110 may generate a corresponding uplink receive beam. In some cases, the UE 120 may be permitted to select the downlink receive beam to optimize reception of a downlink transmission from the network node 110 and/or may be permitted to select the uplink transmit beam to optimize reception at the network node 110 for an uplink transmission by the UE 120.

In general, wireless communication standards currently specify that UE beam management (e.g., in FR2 or FR4) is performed based on either SSB transmissions or CSI-RS P3 transmissions. However, constraining UE beam management to SSB or CSI-RS P3 transmissions may result in an inability to optimize rank-2 performance, where a rank value generally refers to a number of transmission streams (sometimes referred to as layers) that are observed at a receiver (e.g., a UE 120). For example, a transmit antenna and/or a receive antenna may have two ports, which may include a horizontally polarized (H) port and a vertically polarized (V) port. Accordingly, in cases where a transmitter (e.g., the network node 110) transmits a signal using the H port and the V port independently and/or transmits a signal using a suitable precoder (e.g., a non-linear precoder), a receiver (e.g., the UE 120) may simultaneously observe two streams of the transmitted signal, which may be referred to as rank-2 communication. Alternatively, in cases where the transmitter uses a linear precoder (e.g., an H+V precoder or an H–V precoder), or transmits a signal using only one port (e.g., only the H port or only the V port), the receiver may observe only one stream of the transmitted signal, which may be referred to as rank-1 communication.

Although rank-2 communication may offer improved downlink performance, current UE beam management techniques are unable to adequately optimize rank-2 performance. In particular, as described above, current wireless communication standards specify that UE beam management in FR2 or millimeter wave bands is based on either SSB transmissions or CSI-RS P3 transmissions, where an SSB is a rank-1 periodic reference signal that is guaranteed to be transmitted in all 5G NR networks and a CSI-RS P3 is an optional downlink reference signal (e.g., for beam management) that may be configured differently across different 5G NR networks. However, to the extent that a CSI-RS P3 may be configured as a rank-1 signal or a rank-2 signal, there are currently no 5G NR networks that deploy a CSI-RS P3, nor have any infrastructure providers and/or wireless network providers indicated any plans to deploy a CSI-RS P3. As a result, per current wireless communication standards, UE beam management has to work with SSB-based beam selection, which significantly limits the metrics that can be optimized when performing UE beam selection due to SSBs having a rank-1 nature. For example, because an SSB is a rank-1 signal, an SSB typically cannot be used to optimize a rank-2 spectral efficiency or throughput.

Some aspects described herein relate to techniques in which a UE 120 may estimate a multiple rank (e.g., rank-2) spectral efficiency metric from a single rank (e.g., rank-1) reference signal, such as an SSB, whereby the multiple rank spectral efficiency metric can then be used to select a beam to optimize spectral efficiency for a multiple rank data channel, such as a physical downlink shared channel (PDSCH). For example, a network node 110 may be equipped with two transmit ports, which may include a first transmit port associated with a horizontal polarization and a second transmit port associated with a vertical polarization. When the network node 110 transmits a rank-2 signal, such as a CSI-RS or a PDSCH, the network node 110 may apply a precoder on both ports to construct a rank-2 channel, or a 2×2 channel (H), which may be represented in matrix form as shown in the following expression:

$$H = \begin{bmatrix} h_{00} & h_{01} \\ h_{10} & h_{11} \end{bmatrix}$$

In the case of a rank-2 transmission, the UE 120 may observe the 2×2 channel, which can then be used to evaluate one or more beam selection metrics that will have substantially similar properties to traffic carried on a PDSCH (e.g., using a rank-2 metric to make a beam selection decision may optimize performance for rank-2 traffic). However, because an SSB is a rank-1 signal, the network node 110 applies a rank-1 precoder when transmitting an SSB in order to collapse the two transmit ports, whereby the UE 120 can only observe a single stream of the SSB and cannot reconstruct the 2×2 channel that is needed to select a beam to maximize a rank-2 spectral efficiency metric that is similar to a PDSCH spectral efficiency. Nonetheless, under certain channel conditions, the UE 120 may be able to estimate a rank-2 spectral efficiency metric from a rank-1 reference signal transmission, such as an SSB. For example, when the wireless channel between the network node 110 and the UE 120 is non-line-of-sight (NLOS) (e.g., there are one or more obstacles in a propagation path between the network node 110 and the UE 120), a signal transmitted over the wireless channel may be subject to Rayleigh fading. For example, Rayleigh fading is a statistical model that can be used to represent the effect of a propagation environment on a radio signal, which tends to apply in cases where there are many objects in the environment that scatter the radio signal before the signal arrives at the receiver. In particular, if there is sufficient scatter and there is no dominant component to the scatter, a channel impulse response may be modeled as a Gaussian process that has zero mean and a phase evenly distributed between 0 and $2\pi$ radians. Some aspects described herein relate to techniques to exploit this property of NLOS propagation to estimate a multiple rank (e.g., rank-2) spectral efficiency from single rank (e.g., rank-1) SSB measurements.

As indicated above, FIG. 4 is provided as an example of beam management procedures. Other examples of beam management procedures may differ from what is described with respect to FIG. 4. For example, the UE 120 and the network node 110 may perform the third beam management procedure before performing the second beam management procedure, and/or the UE 120 and the network node 110 may perform a similar beam management procedure to select a UE transmit beam.

Figure 5:
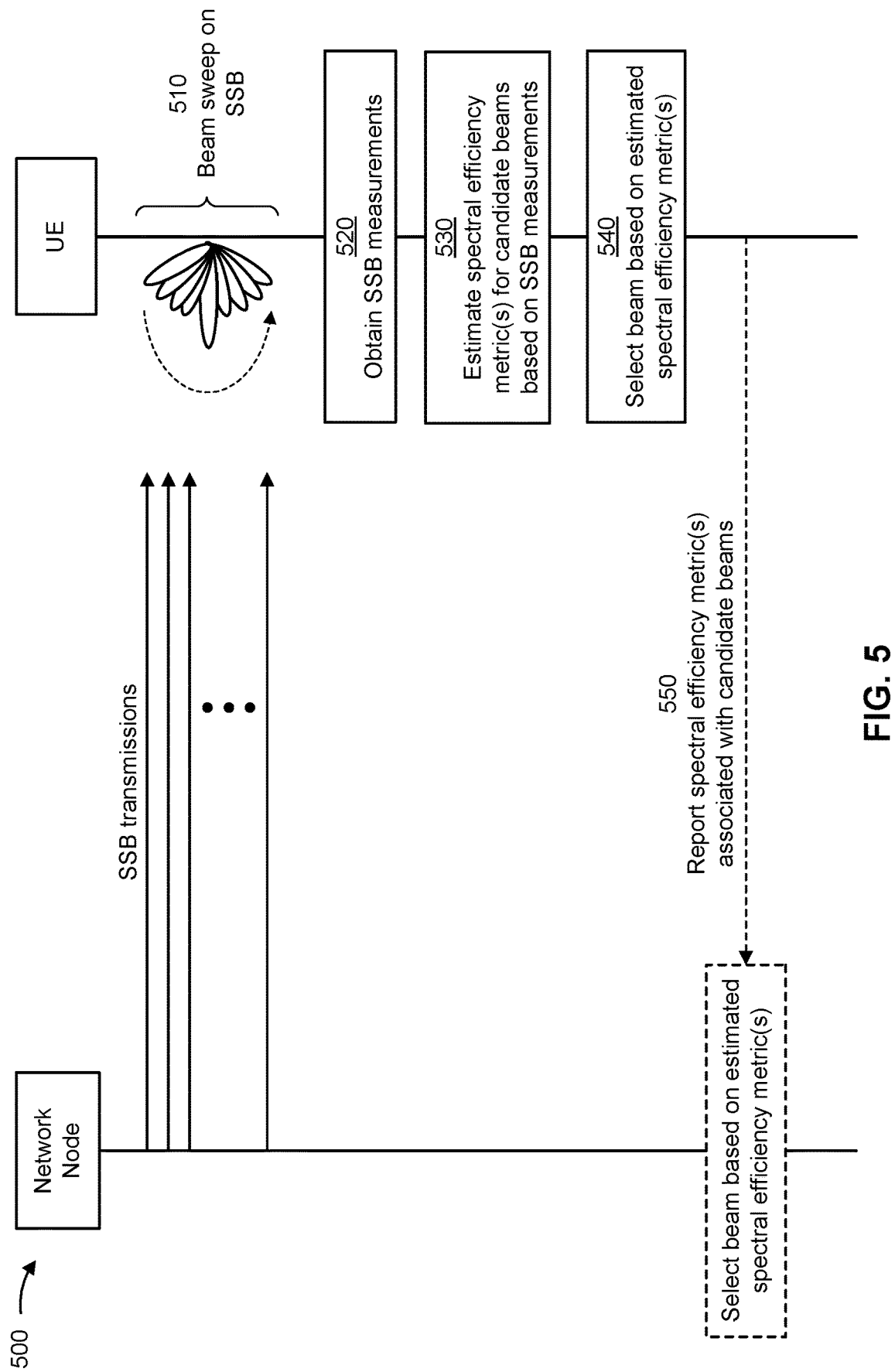
FIG. 5 is a diagram illustrating an example associated with estimating spectral efficiency from a synchronization signal block (SSB), in accordance with the present disclosure.

FIG. 5 is a diagram illustrating an example 500 of estimating spectral efficiency from an SSB, in accordance with the present disclosure. As shown in FIG. 5, example 500 includes a UE in communication with a network node (e.g., a base station, TRP, DU, RU, or the like) in a wireless network. In some aspects, the UE and the network node may communicate using beamforming via a wireless access link, which may include an uplink and a downlink.

As shown by reference number 510, the UE may perform a beam sweep on one or more SSB (or other single rank reference signal) transmissions received from the network node. For example, as described herein, the UE may be configured to optimize rank-2 performance (e.g., where a downlink signal is received via two spatial streams) by performing the beam sweep on the SSB transmissions, which are configured as periodic rank-1 reference signals that are always transmitted by the network node 110 (e.g., to enable initial network acquisition, beam selection, or beam refinement). For example, as described herein, the network node may transmit the SSBs via a first transmit port (e.g., a transmit port associated with a horizontal polarization) and a second transmit port (e.g., a transmit port associated with a vertical polarization) using a rank-1 precoder, which may cause the transmitted signal to be collapsed together into a single spatial stream (e.g., the SSB transmissions are observed as one stream at the UE). Accordingly, because the two transmit ports at the network node are collapsed when the SSBs are transmitted using the rank-1 precoder, the UE may be unable to distinguish the two transmit ports because the two transmit ports are already summed in a vector domain. However, as described herein, the UE may approximate a multiple rank (e.g., rank-2) spectral efficiency from the rank-1 SSB under certain channel conditions.

For example, as shown by reference number 520, the UE may obtain one or more measurements of the SSB transmissions received from the network node. For example, for each candidate beam included among the candidate beams associated with the beam sweep, the UE may obtain a 2×1 signal-to-noise ratio (SNR) vector that includes a first SNR measurement and a second SNR measurement that respectively correspond to SNR measurements at different receive ports of the UE. For example, given a 2×2 complex channel matrix that may be represented as H=[$h_{00}$, $h_{01}$; $h_{10}$,$h_{11}$]. after normalization, the 2×1 SNR vector that the UE obtains from the SSB transmissions for each respective candidate beam may be represented as [$|h_{00}+h_{01}|^2$, $|h_{10}+h_{11}|^2$]. For example, the term $|h_{00}+h_{01}|^2$ may represent the SNR measurement of the rank-1 SSB transmission at a first receive port of the UE, and the term $|h_{10}+h_{11}|^2$ may represent the SNR measurement of the rank-1 SSB transmission at a second receive port of the UE.

As further shown by reference number 530, the UE may estimate one or more spectral efficiency metrics for each candidate beam included in the beam sweep based on the 2×1 SNR vector associated with each respective candidate beam. For example, in some aspects, the rank-2 spectral efficiency per candidate beam may be estimated by the expression $E(\log 2(D(I+H \times H)))$, where $D(I+H \times H)$ is a determinant of the matrix I+H×H. In some aspects, the determinant term, $D(I+H \times H)$, may be approximated by the expression $1+|h_{00}+h_{01}|^2+|h_{10}+h_{11}|^2+|h_{00}+h_{01}|^2|h_{10}+h_{11}|^2$ in cases where the wireless channel between the network node and the UE has zero mean (e.g., subject to Rayleigh fading, which generally holds when the wireless channel is NLOS). For example, in the above expression that approximates the upper bound on the rank-2 spectral efficiency, the term $|h_{00}+h_{01}|^2$ expands to $h_{00}^2+h_{01}^2+2 \times h_{00} \times h_{01}$, and the term $|h_{10}+h_{11}|^2$ similarly expands to $h_{10}^2+h_{11}^2+2 \times h_{10} \times h_{11}$. Accordingly, in cases where the wireless channel has zero mean (e.g., NLOS or otherwise associated with Rayleigh fading), the cross-terms of $2 \times h_{00} \times h_{01}$ and $2 \times h_{10} \times h_{11}$ have zero values. As a result, in cases where the UE determines that the wireless channel has zero mean, the UE may estimate the rank-2 spectral efficiency per candidate beam based on only the values of $|h_{00}+h_{01}|^2$ and $|h_{10}+h_{11}|^2$ that are included in the 2×1 SNR vector per candidate beam. In particular, the UE may estimate the rank-2 spectral efficiency per candidate beam, which represents an upper bound on the spectral efficiency per candidate beam, by computing a value of the expression $E(\log 2(1+|h_{00}+h_{01}|^2+|h_{10}+h_{11}|^2+|h_{00}+h_{01}|^2|h_{10}+h_{11}|^2)$ based on the 2×1 SNR vector that provides the values of $|h_{00}+h_{01}|^2$ and $|h_{10}+h_{11}|^2$ per candidate beam. Additionally, or alternatively, the UE may estimate a rank-1 spectral efficiency per candidate beam, which represents a lower bound on the spectral efficiency per candidate beam, by computing a value of the expression $E(\log 2(1+|h_{00}+h_{01}|^2+|h_{10}+h_{11}|^2)$ based on values of $|h_{00}+h_{01}|^2$ and $|h_{10}+h_{11}|^2$ in the 2×1 SNR vector per candidate beam.

As further shown by reference number 540, the UE may then select a beam to use to receive subsequent downlink transmissions from the network node based on the estimated spectral efficiency metrics associated with the various candidate receive beams that were swept over the SSB transmissions. For example, in some aspects, the UE may select, among the candidate receive beams that were swept over the SSB transmissions, a beam associated with a best (e.g., highest) rank-2 spectral efficiency metric in order to optimize rank-2 performance (e.g., to maximize the upper bound of the spectral efficiency). Additionally, or alternatively, in some aspects, the UE may select a beam associated with a best (e.g., highest) rank-1 spectral efficiency to ensure that the selected beam offers a guaranteed minimum spectral efficiency. Additionally, or alternatively, as shown by reference number 550, the UE may report the spectral efficiency metric(s) associated with the beams swept over the SSB transmissions to the network node, which may indicate, to the UE, the beam that the UE is to use to receive subsequent downlink transmissions based on the reported spectral efficiency metric(s).

As indicated above, FIG. 5 is provided as an example. Other examples may differ from what is described with respect to FIG. 5.

Figure 6:
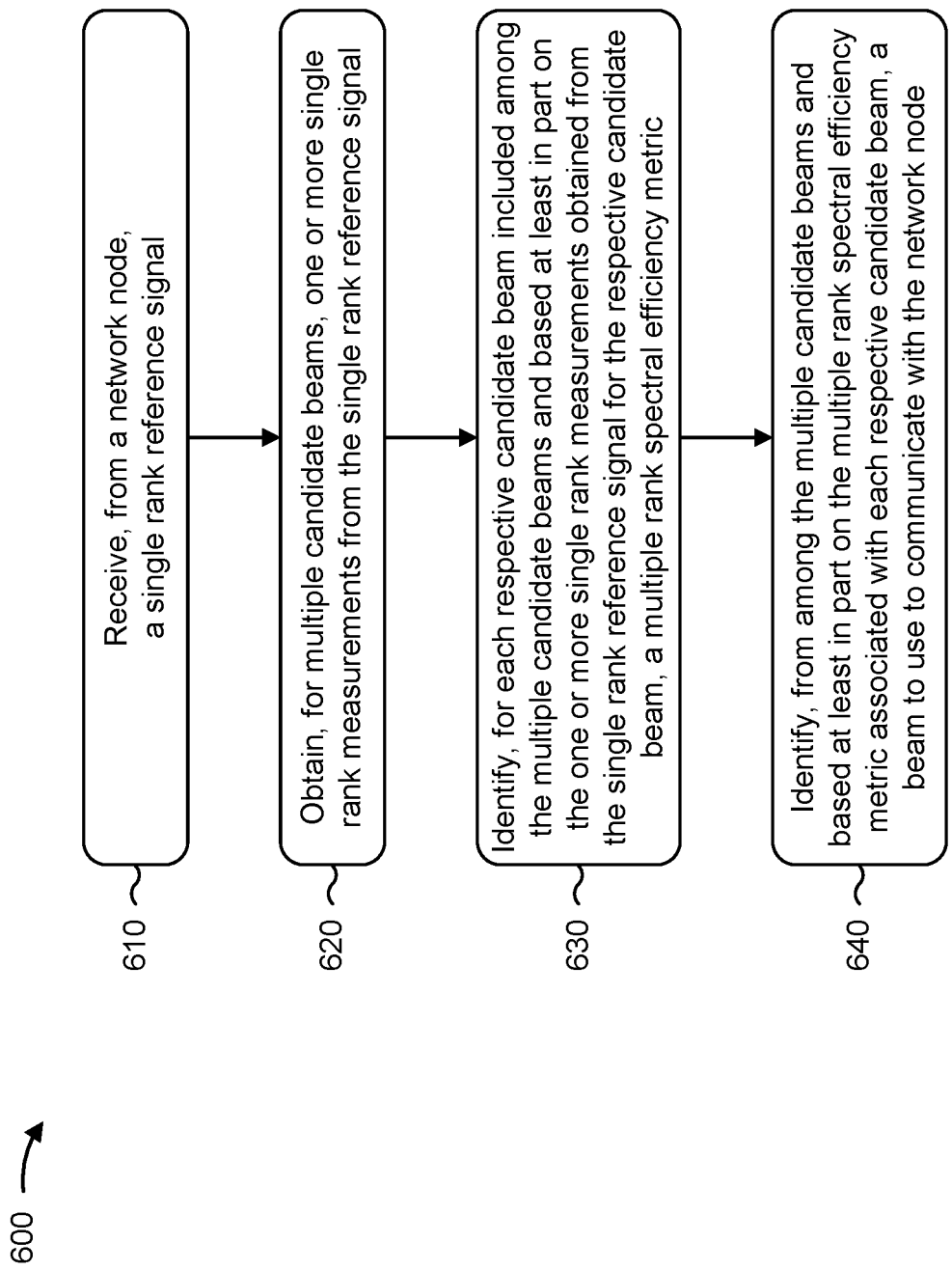
FIG. 6 is a diagram illustrating an example process associated with estimating spectral efficiency from an SSB, in accordance with the present disclosure, in accordance with the present disclosure.

FIG. 6 is a diagram illustrating an example process 600 performed, for example, by a UE, in accordance with the present disclosure. Example process 600 is an example where the UE (e.g., UE 120) performs operations associated with estimating spectral efficiency from an SSB.

As shown in FIG. 6, in some aspects, process 600 may include receiving, from a network node, a single rank reference signal (block 610). For example, the UE (e.g., using communication manager 140 and/or reception component 702, depicted in FIG. 7) may receive, from a network node, a single rank reference signal, as described above.

As further shown in FIG. 6, in some aspects, process 600 may include obtaining, for multiple candidate beams, one or more single rank measurements from the single rank reference signal (block 620). For example, the UE (e.g., using communication manager 140 and/or measurement component 708, depicted in FIG. 7) may obtain, for multiple candidate beams, one or more single rank measurements from the single rank reference signal, as described above.

As further shown in FIG. 6, in some aspects, process 600 may include identifying, for each respective candidate beam included among the multiple candidate beams and based at least in part on the one or more single rank measurements obtained from the single rank reference signal for the respective candidate beam, a multiple rank spectral efficiency metric (block 630). For example, the UE (e.g., using communication manager 140 and/or spectral efficiency estimation component 710, depicted in FIG. 7) may identify, for each respective candidate beam included among the multiple candidate beams and based at least in part on the one or more single rank measurements obtained from the single rank reference signal for the respective candidate beam, a multiple rank spectral efficiency metric, as described above.

As further shown in FIG. 6, in some aspects, process 600 may include identifying, from among the multiple candidate beams and based at least in part on the multiple rank spectral efficiency metric associated with each respective candidate beam, a beam to use to communicate with the network node (block 640). For example, the UE (e.g., using communication manager 140 and/or beam selection component 712, depicted in FIG. 7) may identify, from among the multiple candidate beams and based at least in part on the multiple rank spectral efficiency metric associated with each respective candidate beam, a beam to use to communicate with the network node, as described above.

Process 600 may include additional aspects, such as any single aspect or any combination of aspects described below and/or in connection with one or more other processes described elsewhere herein.

In a first aspect, process 600 includes determining that a wireless channel between the UE and the network node has zero mean, wherein the multiple rank spectral efficiency metric is identified from the one or more single rank measurements for the multiple candidate beams based at least in part on the determination that the wireless channel has zero mean.

In a second aspect, alone or in combination with the first aspect, the determination that the wireless channel between the UE and the network node has zero mean is based at least in part on a determination that the wireless channel is NLOS.

In a third aspect, alone or in combination with one or more of the first and second aspects, the single rank reference signal is an SSB.

In a fourth aspect, alone or in combination with one or more of the first through third aspects, the one or more single rank measurements include, for each of the multiple candidate beams, a first SNR measurement and a second SNR measurement of the single rank reference signal.

In a fifth aspect, alone or in combination with one or more of the first through fourth aspects, the one or more single rank measurements are each associated with a combination of multiple transmit ports at the network node.

In a sixth aspect, alone or in combination with one or more of the first through fifth aspects, process 600 includes identifying a single rank spectral efficiency metric for each respective candidate beam included among the multiple candidate beams based at least in part on the one or more single rank measurements obtained from the single rank reference signal for the respective candidate beam, wherein the beam used to communicate with the network node is identified further based at least in part on the single rank spectral efficiency metric associated with each respective candidate beam.

In a seventh aspect, alone or in combination with one or more of the first through sixth aspects, the multiple rank spectral efficiency metric approximates an upper bound on a spectral efficiency associated with a candidate beam, and the single rank spectral efficiency metric approximates a lower bound on the spectral efficiency associated with the candidate beam.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
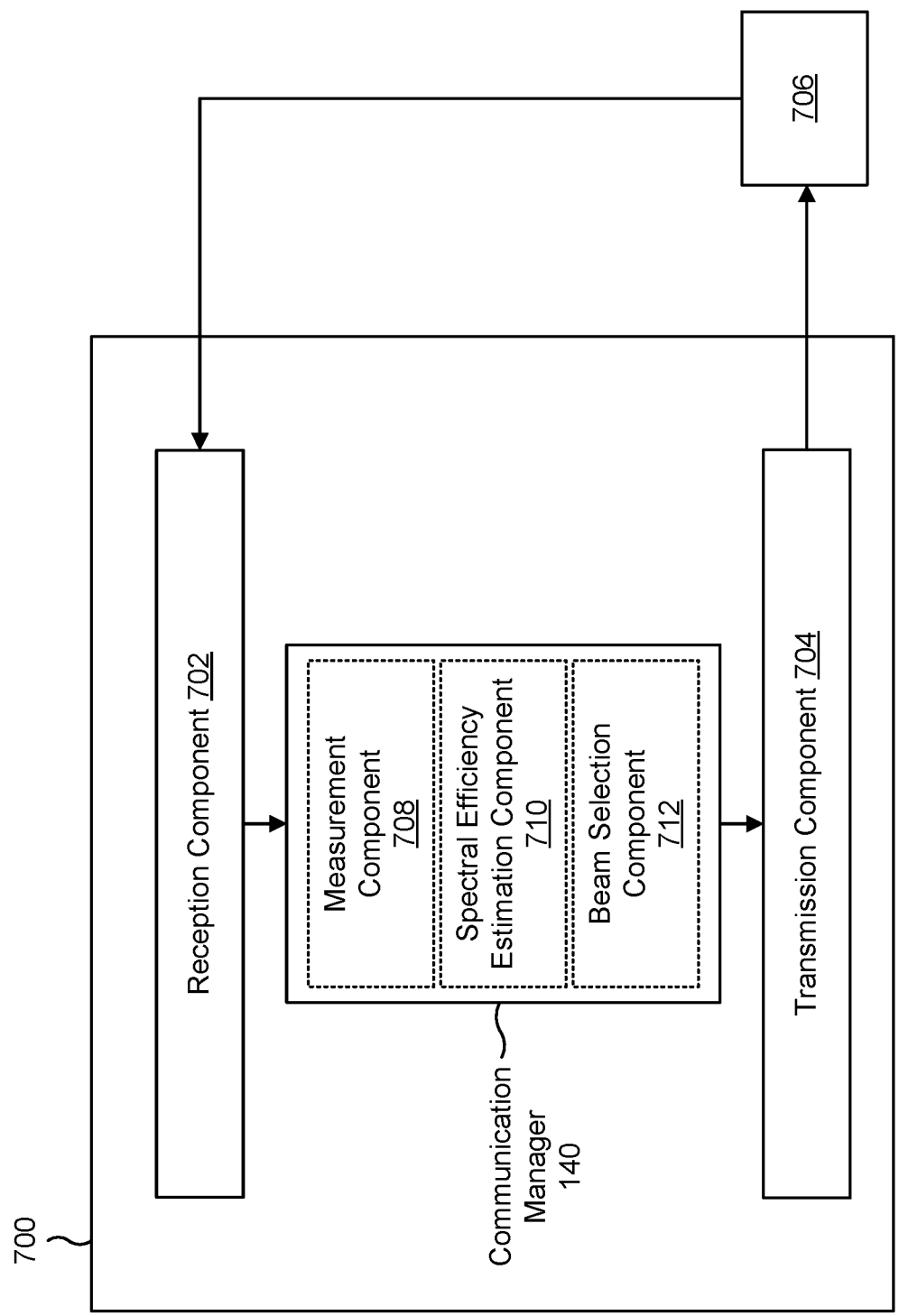
FIG. 7 is a diagram of an example apparatus for wireless communication, in accordance with the present disclosure.

FIG. 7 is a diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include one or more of a measurement component 708, a spectral efficiency estimation component 710, or a beam selection component 712, among other examples.

In some aspects, the apparatus 700 may be configured to perform one or more operations described herein in connection with FIG. 5. Additionally, or alternatively, the apparatus 700 may be configured to perform one or more processes described herein, such as process 600 of FIG. 6. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The reception component 702 may receive, from a network node, a single rank reference signal. The measurement component 708 may obtain, for multiple candidate beams, one or more single rank measurements from the single rank reference signal. The spectral efficiency estimation component 710 may identify, for each respective candidate beam included among the multiple candidate beams and based at least in part on the one or more single rank measurements obtained from the single rank reference signal for the respective candidate beam, a multiple rank spectral efficiency metric. The beam selection component 712 may identify, from among the multiple candidate beams and based at least in part on the multiple rank spectral efficiency metric associated with each respective candidate beam, a beam to use to communicate with the network node.

The spectral efficiency estimation component 710 may determine that a wireless channel between the UE and the network node has zero mean, and may identify the multiple rank spectral efficiency metric from the one or more single rank measurements for the multiple candidate beams based at least in part on the determination that the wireless channel has zero mean.

The spectral efficiency estimation component 710 may identify a single rank spectral efficiency metric for each respective candidate beam included among the multiple candidate beams based at least in part on the one or more single rank measurements obtained from the single rank reference signal for the respective candidate beam, wherein the beam used to communicate with the network node is identified further based at least in part on the single rank spectral efficiency metric associated with each respective candidate beam.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a UE, comprising: receiving, from a network node, a single rank reference signal; obtaining, for multiple candidate beams, one or more single rank measurements from the single rank reference signal; identifying, for each respective candidate beam included among the multiple candidate beams and based at least in part on the one or more single rank measurements obtained from the single rank reference signal for the respective candidate beam, a multiple rank spectral efficiency metric; and identifying, from among the multiple candidate beams and based at least in part on the multiple rank spectral efficiency metric associated with each respective candidate beam, a beam to use to communicate with the network node.

Aspect 2: The method of Aspect 1, further comprising: determining that a wireless channel between the UE and the network node has zero mean, wherein the multiple rank spectral efficiency metric is identified from the one or more single rank measurements for the multiple candidate beams based at least in part on the determination that the wireless channel has zero mean.

Aspect 3: The method of Aspect 2, wherein the determination that the wireless channel between the UE and the network node has zero mean is based at least in part on a determination that the wireless channel is NLOS.

Aspect 4: The method of any of Aspects 1-3, wherein the single rank reference signal is an SSB.

Aspect 5: The method of any of Aspects 1-4, wherein the one or more single rank measurements include, for each of the multiple candidate beams, a first SNR measurement and a second SNR measurement of the single rank reference signal.

Aspect 6: The method of any of Aspects 1-5, wherein the one or more single rank measurements are each associated with a combination of multiple transmit ports at the network node.

Aspect 7: The method of any of Aspects 1-6, further comprising: identifying a single rank spectral efficiency metric for each respective candidate beam included among the multiple candidate beams based at least in part on the one or more single rank measurements obtained from the single rank reference signal for the respective candidate beam, wherein the beam used to communicate with the network node is identified further based at least in part on the single rank spectral efficiency metric associated with each respective candidate beam.

Aspect 8: The method of Aspect 7, wherein the multiple rank spectral efficiency metric approximates an upper bound on a spectral efficiency associated with a candidate beam, and wherein the single rank spectral efficiency metric approximates a lower bound on the spectral efficiency associated with the candidate beam.

Aspect 9: An apparatus for wireless communication at a device, comprising a processor; memory coupled with the processor; and instructions stored in the memory and executable by the processor to cause the apparatus to perform the method of one or more of Aspects 1-8.

Aspect 10: A device for wireless communication, comprising a memory and one or more processors coupled to the memory, the one or more processors configured to perform the method of one or more of Aspects 1-8.

Aspect 11: An apparatus for wireless communication, comprising at least one means for performing the method of one or more of Aspects 1-8.

Aspect 12: A non-transitory computer-readable medium storing code for wireless communication, the code comprising instructions executable by a processor to perform the method of one or more of Aspects 1-8.

Aspect 13: A non-transitory computer-readable medium storing a set of instructions for wireless communication, the set of instructions comprising one or more instructions that, when executed by one or more processors of a device, cause the device to perform the method of one or more of Aspects 1-8.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
      receive, from a network node, a single rank reference signal;
      obtain, for multiple candidate beams, one or more single rank measurements from the single rank reference signal;
      identify, for each respective candidate beam included among the multiple candidate beams and based at least in part on the one or more single rank measurements obtained from the single rank reference signal for the respective candidate beam, a multiple rank spectral efficiency metric; and
      identify, from among the multiple candidate beams and based at least in part on the multiple rank spectral efficiency metric associated with each respective candidate beam, a beam to use to communicate with the network node.

2. The UE of claim 1, wherein the one or more processors are further configured to:
   determine that a wireless channel between the UE and the network node has zero mean, wherein the multiple rank spectral efficiency metric is identified from the one or more single rank measurements for the multiple candidate beams based at least in part on the determination that the wireless channel has zero mean.

3. The UE of claim 2, wherein the determination that the wireless channel between the UE and the network node has zero mean is based at least in part on a determination that the wireless channel is non-line-of-sight.

4. The UE of claim 1, wherein the single rank reference signal is a synchronization signal block.

5. The UE of claim 1, wherein the one or more single rank measurements include, for each of the multiple candidate beams, a first signal-to-noise ratio (SNR) measurement and a second SNR measurement of the single rank reference signal.

6. The UE of claim 1, wherein the one or more single rank measurements are each associated with a combination of multiple transmit ports at the network node.

7. The UE of claim 1, wherein the one or more processors are further configured to:
   identify a single rank spectral efficiency metric for each respective candidate beam included among the multiple candidate beams based at least in part on the one or more single rank measurements obtained from the single rank reference signal for the respective candidate beam, wherein the beam used to communicate with the network node is identified further based at least in part on the single rank spectral efficiency metric associated with each respective candidate beam.

8. The UE of claim 7, wherein the multiple rank spectral efficiency metric approximates an upper bound on a spectral efficiency associated with a candidate beam, and wherein the single rank spectral efficiency metric approximates a lower bound on the spectral efficiency associated with the candidate beam.

9. A method of wireless communication performed by a user equipment (UE), comprising:
   receiving, from a network node, a single rank reference signal;
   obtaining, for multiple candidate beams, one or more single rank measurements from the single rank reference signal;
   identifying, for each respective candidate beam included among the multiple candidate beams and based at least in part on the one or more single rank measurements obtained from the single rank reference signal for the respective candidate beam, a multiple rank spectral efficiency metric; and
   identifying, from among the multiple candidate beams and based at least in part on the multiple rank spectral efficiency metric associated with each respective candidate beam, a beam to use to communicate with the network node.

10. The method of claim 9, further comprising:
    determining that a wireless channel between the UE and the network node has zero mean, wherein the multiple rank spectral efficiency metric is identified from the one or more single rank measurements for the multiple candidate beams based at least in part on the determination that the wireless channel has zero mean.

11. The method of claim 10, wherein the determination that the wireless channel between the UE and the network node has zero mean is based at least in part on a determination that the wireless channel is non-line-of-sight.

12. The method of claim 9, wherein the single rank reference signal is a synchronization signal block.

13. The method of claim 9, wherein the one or more single rank measurements include, for each of the multiple candidate beams, a first signal-to-noise ratio (SNR) measurement and a second SNR measurement of the single rank reference signal.

14. The method of claim 9, wherein the one or more single rank measurements are each associated with a combination of multiple transmit ports at the network node.

15. The method of claim 9, further comprising:
    identifying a single rank spectral efficiency metric for each respective candidate beam included among the multiple candidate beams based at least in part on the one or more single rank measurements obtained from the single rank reference signal for the respective candidate beam, wherein the beam used to communicate with the network node is identified further based at least in part on the single rank spectral efficiency metric associated with each respective candidate beam.

16. The method of claim 15, wherein the multiple rank spectral efficiency metric approximates an upper bound on a spectral efficiency associated with a candidate beam, and wherein the single rank spectral efficiency metric approximates a lower bound on the spectral efficiency associated with the candidate beam.

17. A non-transitory computer-readable medium storing a set of instructions for wireless communication, the set of instructions comprising:
one or more instructions that, when executed by one or more processors of a user equipment (UE), cause the UE to:
receive, from a network node, a single rank reference signal;
obtain, for multiple candidate beams, one or more single rank measurements from the single rank reference signal;
identify, for each respective candidate beam included among the multiple candidate beams and based at least in part on the one or more single rank measurements obtained from the single rank reference signal for the respective candidate beam, a multiple rank spectral efficiency metric; and
identify, from among the multiple candidate beams and based at least in part on the multiple rank spectral efficiency metric associated with each respective candidate beam, a beam to use to communicate with the network node.

18. The non-transitory computer-readable medium of claim 17, wherein the one or more instructions further cause the UE to:
determine that a wireless channel between the UE and the network node has zero mean, wherein the multiple rank spectral efficiency metric is identified from the one or more single rank measurements for the multiple candidate beams based at least in part on the determination that the wireless channel has zero mean.

19. The non-transitory computer-readable medium of claim 18, wherein the determination that the wireless channel between the UE and the network node has zero mean is based at least in part on a determination that the wireless channel is non-line-of-sight.

20. The non-transitory computer-readable medium of claim 17, wherein the single rank reference signal is a synchronization signal block.

21. The non-transitory computer-readable medium of claim 17, wherein the one or more single rank measurements include, for each of the multiple candidate beams, a first signal-to-noise ratio (SNR) measurement and a second SNR measurement of the single rank reference signal.

22. The non-transitory computer-readable medium of claim 17, wherein the one or more single rank measurements are each associated with a combination of multiple transmit ports at the network node.

23. The non-transitory computer-readable medium of claim 17, wherein the one or more instructions further cause the UE to:
identify a single rank spectral efficiency metric for each respective candidate beam included among the multiple candidate beams based at least in part on the one or more single rank measurements obtained from the single rank reference signal for the respective candidate beam, wherein the beam used to communicate with the network node is identified further based at least in part on the single rank spectral efficiency metric associated with each respective candidate beam.

24. An apparatus for wireless communication, comprising:
means for receiving, from a network node, a single rank reference signal;
means for obtaining, for multiple candidate beams, one or more single rank measurements from the single rank reference signal;
means for identifying, for each respective candidate beam included among the multiple candidate beams and based at least in part on the one or more single rank measurements obtained from the single rank reference signal for the respective candidate beam, a multiple rank spectral efficiency metric; and
means for identifying, from among the multiple candidate beams and based at least in part on the multiple rank spectral efficiency metric associated with each respective candidate beam, a beam to use to communicate with the network node.

25. The apparatus of claim 24, further comprising:
means for determining that a wireless channel between the apparatus and the network node has zero mean, wherein the multiple rank spectral efficiency metric is identified from the one or more single rank measurements for the multiple candidate beams based at least in part on the determination that the wireless channel has zero mean.

26. The apparatus of claim 25, wherein the determination that the wireless channel between the apparatus and the network node has zero mean is based at least in part on a determination that the wireless channel is non-line-of-sight.

27. The apparatus of claim 24, wherein the single rank reference signal is a synchronization signal block.

28. The apparatus of claim 24, wherein the one or more single rank measurements include, for each of the multiple candidate beams, a first signal-to-noise ratio (SNR) measurement and a second SNR measurement of the single rank reference signal.

29. The apparatus of claim 24, wherein the one or more single rank measurements are each associated with a combination of multiple transmit ports at the network node.

30. The apparatus of claim 24, further comprising:
means for identifying a single rank spectral efficiency metric for each respective candidate beam included among the multiple candidate beams based at least in part on the one or more single rank measurements obtained from the single rank reference signal for the respective candidate beam, wherein the beam used to communicate with the network node is identified further based at least in part on the single rank spectral efficiency metric associated with each respective candidate beam.

* * * * *